(12) United States Patent
Ryou

(10) Patent No.: US 7,837,098 B2
(45) Date of Patent: Nov. 23, 2010

(54) METHOD FOR ON-LINE SHARING OF TMK (TERMINAL MASTER KEY) BETWEEN ATM AND HOST

(75) Inventor: Jae Cheol Ryou, Daejeon (KR)

(73) Assignee: Nautilus Hyosung Inc., Seoul (KR)

( * ) Notice: Subject to any disclaimer, the term of this patent is extended or adjusted under 35 U.S.C. 154(b) by 47 days.

(21) Appl. No.: 12/411,731

(22) Filed: Mar. 26, 2009

(65) Prior Publication Data

US 2010/0116878 A1    May 13, 2010

(30) Foreign Application Priority Data

Nov. 11, 2008   (KR) .................... 10-2008-0111482

(51) Int. Cl.
*G06F 17/60*   (2006.01)
(52) U.S. Cl. .................... 235/379; 235/378; 705/41; 705/50
(58) Field of Classification Search ............... 235/378, 235/379; 705/41, 50
See application file for complete search history.

(56) References Cited

U.S. PATENT DOCUMENTS

2003/0236748 A1* 12/2003 Gressel et al. .............. 705/41
2010/0031021 A1* 2/2010 Arnold et al. .............. 713/155
2010/0080394 A1* 4/2010 Harrison et al. ............ 380/278
2010/0088230 A1* 4/2010 Drummond et al. ......... 705/43
2010/0180121 A1* 7/2010 Chow et al. ............... 713/175

OTHER PUBLICATIONS

Menezes, A. et al., "Chapter 10: Identification and Entity Authentication," Handbook of Applied Cryptography, 1996, pp. 385-424, CRC Press, Inc.
Menezes, A. et al., "Chapter 12: Key Establishment Protocols," Handbook of Applied Cryptography, 1996, pp. 489-541, CRC Press, Inc.
Menezes, A. et al., "Chapter 13: Key Management Techniques," Handbook of Applied Cryptography, 1996, pp. 543-590, CRC Press, Inc.

* cited by examiner

*Primary Examiner*—Allyson N Trail
(74) *Attorney, Agent, or Firm*—Fenwick & West LLP

(57) ABSTRACT

Provided is a method and apparatus for establishing online a shared key that is required to perform a security communication between an automatic teller machine (ATM) and a host. Through this, it is possible to reduce costs and procedures that may be required to use or operate a certificate authority. Also, it is possible to reduce overheads that may occur in generating and verifying a certificate. Accordingly, it is possible to more securely prevent a leakage of the shared key.

10 Claims, 13 Drawing Sheets

100

_US 7,837,098 B2_

METHOD FOR ON-LINE SHARING OF TMK (TERMINAL MASTER KEY) BETWEEN ATM AND HOST

CROSS-REFERENCE TO RELATED APPLICATION

This application claims the benefit of Republic of Korea Patent Application No. 10-2008-0111482, filed on Nov. 11, 2008, in the Korean Intellectual Property Office, the disclosure of which is incorporated herein by reference.

BACKGROUND

1. Field of the Invention

The present invention relates to a method and apparatus for establishing online a shared key that is required to perform a security communication between an automatic teller machine (ATM) and a host. More particularly, the present invention relates to a method of performing a mutual authentication between an ATM and a host, a method of generating a shared key to be used based on the mutual authentication, and a system for performing the methods.

2. Description of the Related Art

In order to perform a security communication between an automatic teller machine (ATM) and a host, a shared key such as a terminal master key (TMK) may need to be established. In a conventional art, the simplest scheme of establishing the TMK is that a manager directly visits the ATM and the host to input and store the TMK in the ATM and the host. For example, when establishing the TMK in the ATM, a reliable manager may visit the ATM in person to thereby input and store the TMK in the ATM. However, in the above conventional offline scheme, the manager may need to visit each ATM in order to input and store the TMK. Accordingly, it may be very inconvenient and the shared key may be easily leaked by the manager.

Diebold Inc. disclosed a method of establishing online a shared key between an ATM and a host. The above method may further include a certificate authority.

FIG. 1 illustrates a relationship among a host 10, an ATM 20, and a certificate authority 30 in the disclosed shared key establishing method of Diebold Inc.

As shown in FIG. 1, before starting an online shared key establishing process, necessary keys may need to be pre-stored in the host 10 and the ATM 20. A secret key $s_A$ of the ATM 20, a public key $e_A$ corresponding to the secret key $s_A$, and an identification number (ID) $ID_A$ of the ATM 20 may be installed and be stored in the ATM 20. Also, a certificate $e_A*$ that is signed at the certificate authority 30 with respect to the public key $e_A$ of the ATM 20 may be installed and stored be in a safe environment. The certificate $e_A*$ may be generated by encrypting the public key $e_A$ of the ATM 20 using a secret key of the certificate authority 30. In this instance, the ID $ID_A$ of the ATM 20 may also be encrypted and be included in the certificate $e_A*$.

Also, a secret key $s_H$ of the host 10 and a public key $e_H$ corresponding to the secret key $s_H$ may be installed and be stored in the host 10, in a safe environment. Also, a certificate $e_H*$ that is signed at the certificate authority 30 with respect to the public key $e_H$ of the host 10 may be installed and be stored in the safe environment. The certificate $e_H*$ may be generated by encrypting the public key $e_H$ of the host 10 using the secret key of the certificate authority 30. In this instance, the ID $ID_H$ of the host 10 may also be encrypted and be included in the certificate $e_H*$.

FIG. 2 illustrates a shared key establishing process of Diebold Inc.

In a state where the secret keys $s_A$ and $s_H$, the public keys $e_A$ and $e_H$, the certificates $e_A*$ and $e_H*$, and the like of FIG. 1 are installed and are stored in a host 10 and an ATM 20, the process of FIG. 2 may be performed.

In operation S11, the ATM 20 may transmit, to the host 10, the public key $e_A$, the certificate $e_A*$, the ID $ID_A$, and a signature value $ID_A*$. As described above, the public key $e_A$, the certificate $e_A*$, and the ID $ID_A$ are installed and stored in the ATM 20 in advance. The signature value $ID_A*$ may be generated by encrypting, at the ATM 20, the ID $ID_A$ using the secret key $s_A$.

In operation S12, the host 10 may verify and store the public key $e_A$ and the ID $ID_A$ of the ATM 20. The host 10 may obtain the public key $e_A$ and the ID $ID_A$ of the ATM 20 by decrypting the certificate $e_A*$ using a public key of a certificate authority (not shown). Through the decryption, the host 10 may verify the relationship between the ID $ID_A$ and the public key $e_A$ of the ATM 20. The host 10 may decrypt the signature value $ID_A*$ using the public key $e_A$ of the ATM 20. When the ID $ID_A$ generated by decrypting the signature value $ID_A*$ is the same as the ID $ID_A$ received from the ATM 20, the host 10 may determine, as a right ATM with $ID_A$, the ATM that has transmitted the public key $e_A$, the certificate $e_A*$, the ID $ID_A$, and the signature value $ID_A*$. This is because only the ATM 20 with the secret key $s_A$ corresponding to the public key $e_A$ of the ATM 20 may generate the signature value $ID_A*$ that can be decrypted using the public key $e_A$ of the ATM 20.

In operation S13, the host 10 may transmit, to the ATM 20, the public key $e_H$ and the certificate $e_H*$ of the host 10. In operation S14, the ATM 20 may verify and store the public key $e_H$ of the host 10.

In operation S15, the host 10 may generate a shared key, for example, a terminal master key (TMK). In operation S16, the host 10 may transmit, to the ATM 20, a value $Ee_A(TMK)$ that is obtained by encrypting the TMK using the public key $e_A$ of ATM 20, and a signature value $Es_H[Ee_A(TMK)]$ that is obtained by signing the value $Ee_A(TMK)$ using the secret key $s_H$ of the host 10.

In operation S17, the ATM 20 may verify and decrypt $Ee_A(TMK)$ to thereby obtain the TMK. Specifically, the ATM 20 may obtain $Ee_A(TMK)$ by decrypting $Es_A[Ee_A(TMK)]$ using the public key $e_H$ of the host 10, and may determine whether the obtained $Ee_A(TMK)$ is the same as the received $Ee_A(TMK)$. When they are the same, the ATM 20 may determine the received $Ee_A(TMK)$ is transmitted by a right host. The ATM 20 may obtain the TMK by decrypting $Ee_A(TMK)$ using the secret key $s_A$ of the ATM 20.

The shared key establishing process disclosed by Diebold may be performed through the aforementioned procedures. In the case of the above shared key establishing process, a third party, for example, a certificate authority may be required in addition to the host 10 and the ATM 20. As described above, the ATM 20 may need to be assigned in advance with the certificate $e_A*$ from the certificate authority and to store the assigned certificate $e_A*$. The host 10 may also need to be assigned with the certificate $e_H*$ from the certificate authority and to store the assigned certificate $e_H*$. Accordingly, in the case of the above shared key establishing process of Diebold Inc., overhead may occur in a process of assigning a corresponding certificate. Also, the TMK corresponding to the shared key may be uni-directionally transmitted from the host 10 to the ATM 20. Accordingly, once the secret key $s_A$ of the ATM 20 is leaked, the TMK may also be immediately known.

SUMMARY

An aspect of the present invention provides a method and apparatus for establishing a shared key between an automatic teller machine (ATM) and a host without a need for a certificate authority.

Another aspect of the present invention also provides a method and apparatus for establishing a shared key between an ATM and a host without a need to generate and verify a certificate.

Another aspect of the present invention also provides a method and apparatus for establishing a shared key that may more securely establish a shared key to be used between an ATM and a host and thereby may prevent the shared key from being known or leaked.

According to an aspect of the present invention, there is provided a method of establishing a shared key to be used between a host and an automatic teller machine, the method including: a first operation of inputting and storing a public key of the automatic teller machine and an identification number (ID) thereof in the host; a second operation of generating, at the host, a first A nounce and encrypting the first A nounce using the public key of the automatic teller machine to thereby transmit the encrypted first A nounce, and receiving a first B nounce from the automatic teller machine to thereby determine whether the first A nounce is the same as the first B nounce; a third operation of generating, at the automatic teller machine, a second A nounce and encrypting the second A nounce using a public key of the host to thereby transmit encrypted second A nounce to the host, and receiving a second B nounce from the host to thereby determine whether the second A nounce is the same as the second B nounce; a fourth operation of generating and encrypting, at the host, a first partial key to transmit the encrypted first partial key to the automatic teller machine; and a fifth operation of generating and encrypting, at the automatic teller machine, a second partial key to transmit the encrypted second partial key to the host. The shared key may be generated by operating the first partial key and the second partial key. Also, the second through the fifth operations may be overlapped with each other and thereby are performed.

According to another aspect of the present invention, there is provided a shared key establishing method that is performed at a host in order to establish a shared key to be used between the host and an automatic teller machine, the method including: a first operation of generating first information including a first partial key and a first nounce to thereby transmit, to the automatic teller machine, a first cryptogram where the first information is encrypted using a public key of the automatic teller machine, in a state where the public key of the automatic teller machine and an ID thereof are stored in the host; a second operation of receiving, from the automatic teller machine, a second cryptogram where second information is encrypted using a public key of the host, wherein the second information includes the first nounce that is obtained by decrypting, at the automatic teller machine, the first cryptogram, and a second partial key and a second nounce that are generated at the automatic teller machine; a third operation of determining whether the first nounce obtained by decrypting the second cryptogram is the same as the first nounce transmitted in the first operation; and a fourth operation of transmitting, to the automatic teller machine, third information including the second nounce that is obtained by decrypting the second cryptogram. The shared key may be generated based on the first partial key and the second partial key.

According to still another aspect of the present invention, there is provided a shared key establishing method that is performed at an automatic teller machine in order to establish a shared key to be used between a host and the automatic teller machine, the method including: a first operation of receiving, from the host, a first cryptogram where first information including a first partial key and a first nounce is encrypted using a public key of the automatic teller machine, in a state where the public key of the automatic teller machine and an ID thereof are stored in the host; a second operation of generating a second partial key and a second nounce and decrypting the first cryptogram using a secret key corresponding to the public key of the automatic teller machine to thereby obtain the first partial key and the first nounce, and generating a second cryptogram where second information including the second partial key, the first nounce, and the second nounce are encrypted using a public key of the host to thereby transmit the second cryptogram to the host; a third operation of receiving, from the host, third information including the second nounce that is obtained by decrypting, at the host, the second cryptogram; and a fourth operation of determining whether the second nounce obtained in the third operation is the same as the second nounce transmitted in the second operation. The shared key may be generated based on the first partial key and the second partial key.

According to yet another aspect of the present invention, there is provided a host to perform a data communication with an automatic teller machine and to establish online a shared key to be used for the data communication, the host including: a key management center to store a public key of the automatic teller machine and an ID thereof, and a host computer i) to generate first information including a first partial key and a first nounce to transmit, to the automatic teller machine, a first cryptogram where the first information is encrypted using the public key of the automatic teller machine, ii) to receive, from the automatic teller machine, a second cryptogam where second information is encrypted using a public key of the host, wherein the second information includes the first nounce that is obtained by decrypting, at the automatic teller machine, the first cryptogram, and a second partial key and a second nounce that are generated at the automatic teller machine, iii) to determine whether the first nounce obtained by decrypting the second cryptogram is the same as the first nounce included in the first information, and iv) to transmit, to the automatic teller machine, third information including the second nounce that is obtained by decrypting the second cryptogram. The shared key may be generated based on the first partial key and the second partial key.

According to a further another aspect of the present invention, there is provided an automatic teller machine to perform a data communication with a host and to establish online a shared key to be used for the data communication, the automatic teller machine including: a storage unit to store a public key of the host and a secret key of the automatic teller machine; and a control unit i) to control the automatic teller machine to receive, from the host, a first cryptogram where first information including a first partial key and a first nounce is encrypted using a public key of the automatic teller machine, ii) to control the automatic teller machine to generate a second partial key and a second nounce, to decrypt the first cryptogram using a secret key corresponding to the public key of the automatic teller machine to thereby obtain the first partial key and the first nounce, and to generate a second cryptogram where second information including the second partial key, the first nounce, and the second nounce are encrypted using the public key of the host, to thereby transmit the second cryptogram to the host, iii) to control the automatic teller machine to receive, from the host, third information including the second nounce that is obtained by decrypting, at the host, the second cryptogram, and iv) to control the automatic teller machine to determine whether the second nounce included in the third information is the same as the second nounce included in the second cryptogram. The shared key may be generated based on the first partial key and the second partial key.

According to still another aspect of the present invention, there is provided an automatic teller machine to perform a data communication with a host and to establish online a shared key to be used for the data communication, the automatic teller machine including: a storage unit to store a hashing value of a public key of the host and a secret key of the automatic teller machine; and a control unit i) to control the automatic teller machine to receive, from, the host, a first cryptogram where first information including a first partial key and a first nounce is encrypted using a public key of the automatic teller machine, ii) to control the automatic teller machine to generate a second partial key and a second nounce, to decrypt the first cryptogram using a secret key corresponding to the public key of the automatic teller machine to thereby obtain the first partial key and the first nounce, and to generate a second cryptogram where second information including the second partial key, the first nounce, and the second nounce are encrypted using the public key of the host, to thereby transmit the second cryptogram to the host, iii) to control the automatic teller machine to receive, from the host, third information including the second nounce that is obtained by decrypting, at the host, the second cryptogram, and iv) to control the automatic teller machine to determine whether the second nounce included in the third information is the same as the second nounce included in the second cryptogram. The shared key may be generated based on the first partial key and the second partial key.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings.

DETAILED DESCRIPTION

Figure 1:
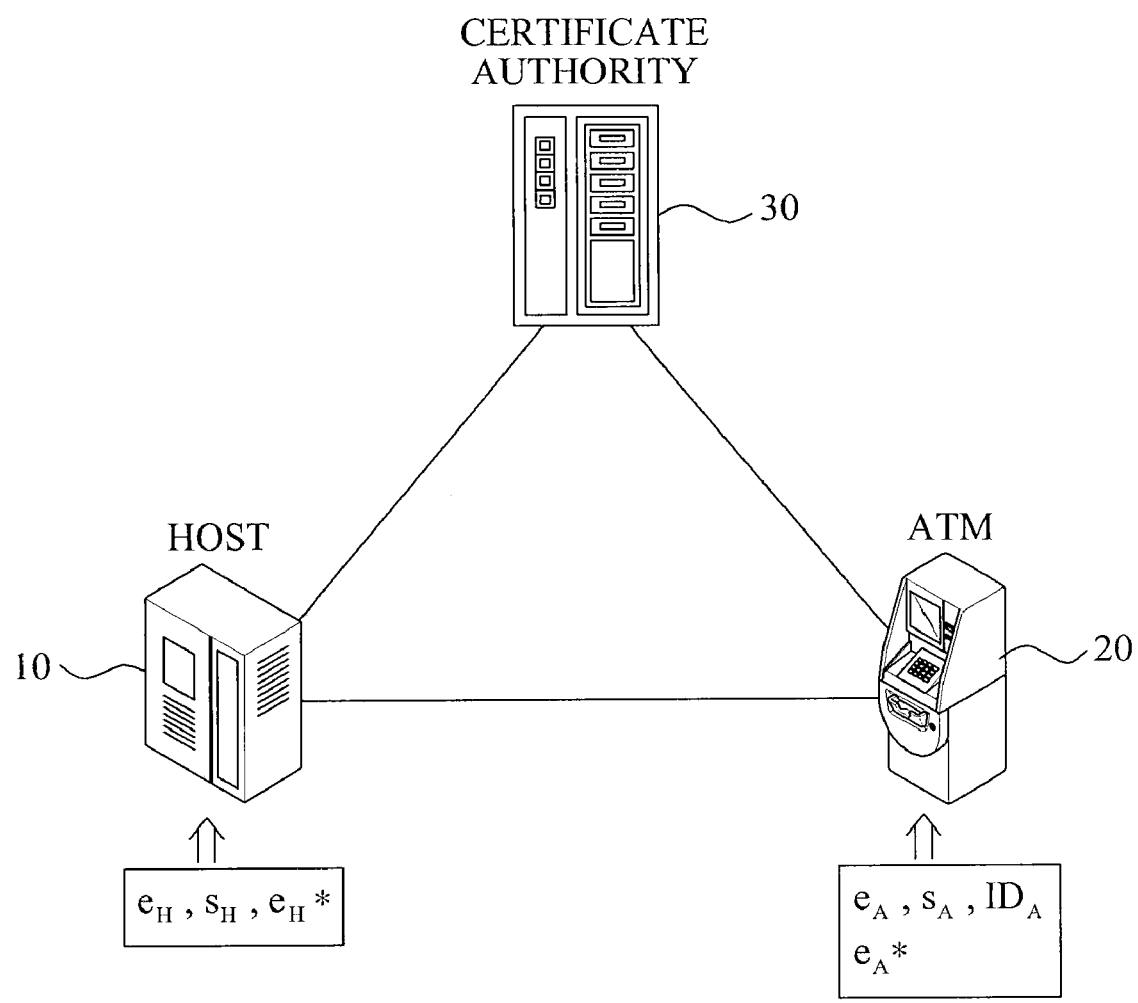
FIG. 1 illustrates a relationship among an automatic teller machine (ATM), a host, and a certificate authority in a shared key establishing method of Diebold Inc.
Figure 2:
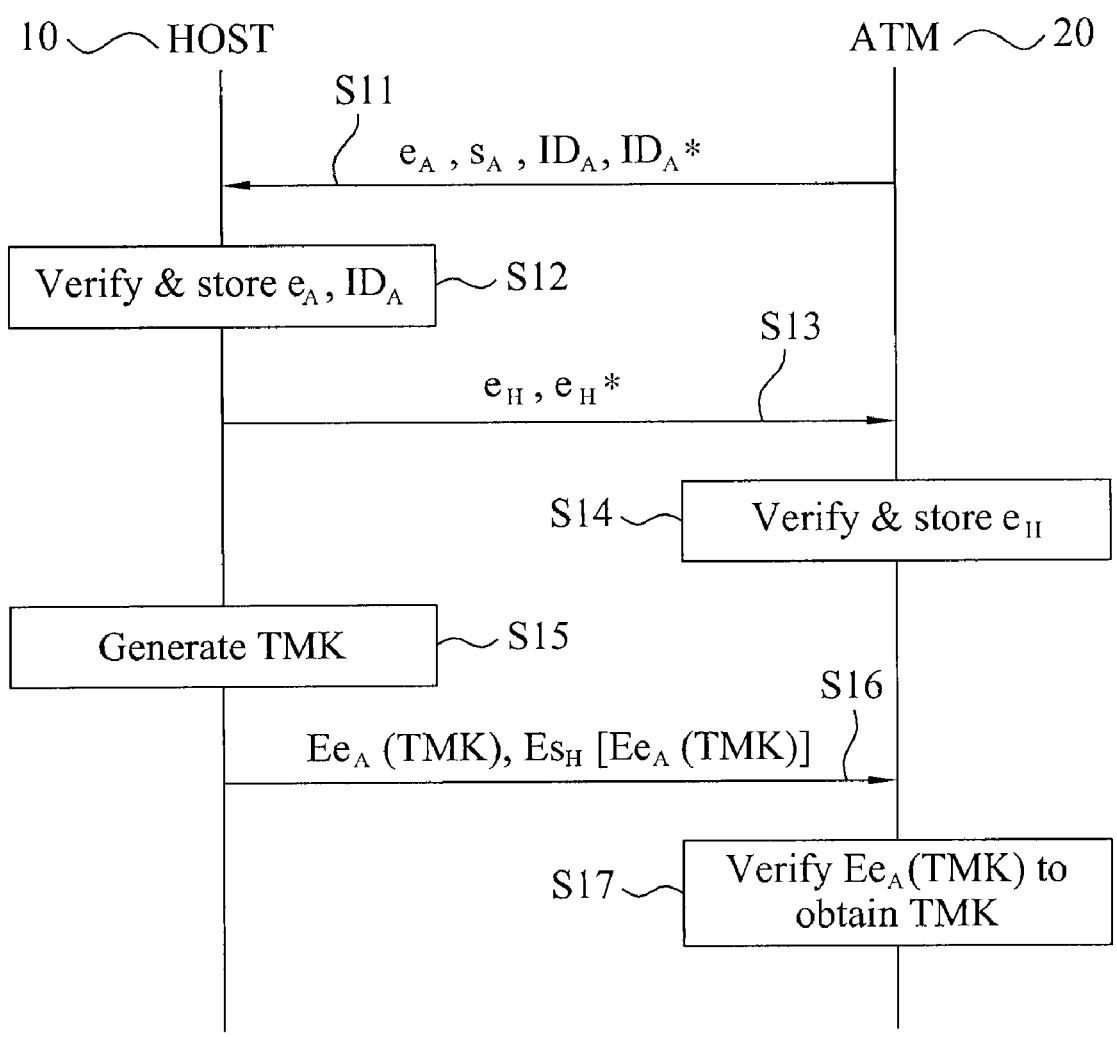
FIG. 2 illustrates a shared key establishing process of Diebold Inc.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 3A:
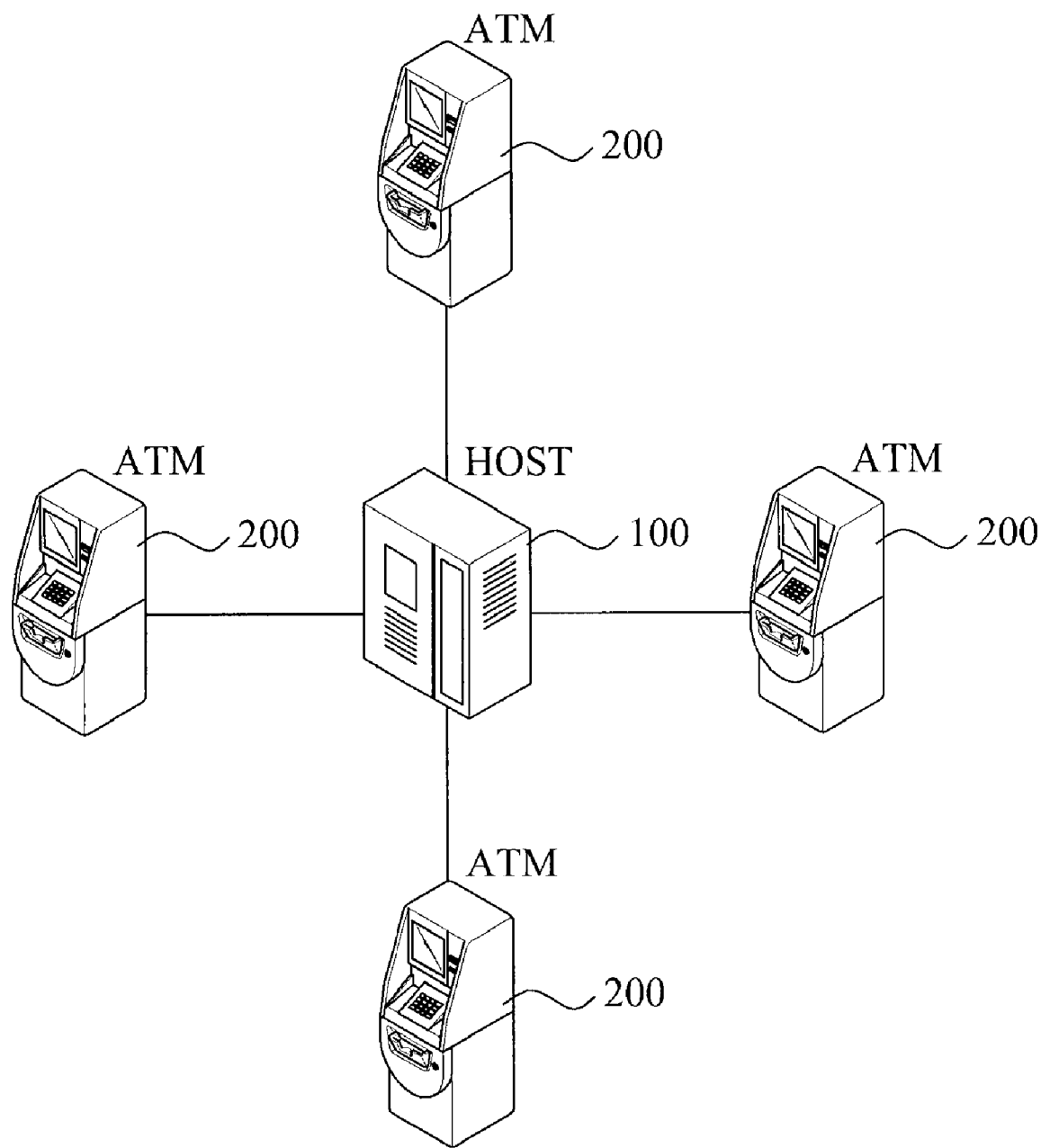
FIG. 3A illustrates a connection state between a host and an ATM according to an embodiment of the present invention.

FIG. 3A illustrates a connection state between a host 100 and a plurality of automatic teller machines (ATMs) 200 according to an embodiment of the present invention.

Each of the ATMs 200 may be connected to the host 10 via a communication network to perform a data communication with the host 100. Although the plurality of ATMs 200 is connected to the single host 100 in FIG. 3A, the shape of the communication network may be unimportant. Also, although four ATMs 200 are connected to the host 10 in FIG. 3A, the present invention is not limited thereto. Specifically, a number of ATMs may be changed depending on embodiments.

Figure 3B:
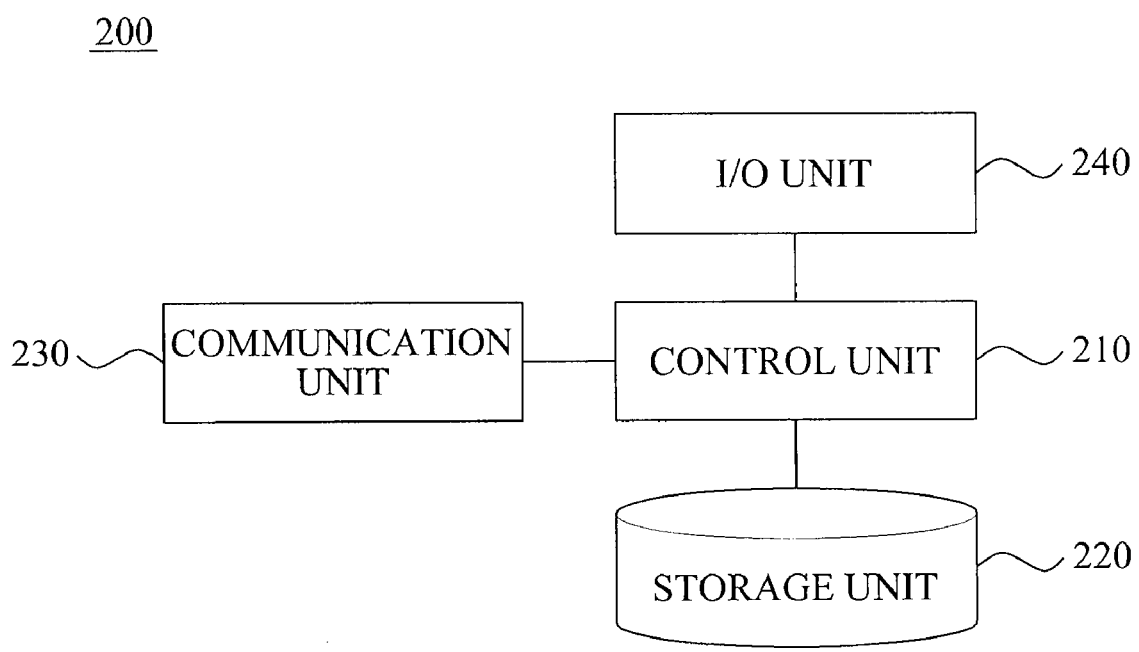
FIG. 3B is a block diagram illustrating a configuration of the ATM of FIG. 3A.

FIG. 3B is a block diagram illustrating a configuration of the ATM 200 of FIG. 3A. As shown in FIG. 3B, the ATM 200 may include a control unit 210, a storage unit 220, a communication unit 230, and an input/output unit 240.

The storage unit 220 may store information to be used in the ATM 200, for example, a secret key and a public key of the ATM 200, and a public key of the host 100. In this instance, the storage unit 220 may store a hashing value of the public key of the host 100 instead of storing the public key of the host 100. Description related thereto will be made in detail later.

The control unit 210 may control constituent elements of the ATM 200, such as the storage unit 220, the communication unit 230, and the input/output unit 240. In particular, the control unit 210 may perform a specific operation and process that is required to perform a shared key establishing method, which will be described later.

Although not shown in the figures, the input/output unit 240 may include a display unit to display an image, a touch screen and a keyboard to receive an input from a user, a currency depositing/withdrawing unit to deposit and withdraw currency, a printing unit to print a bill, and the like.

Figure 3C:
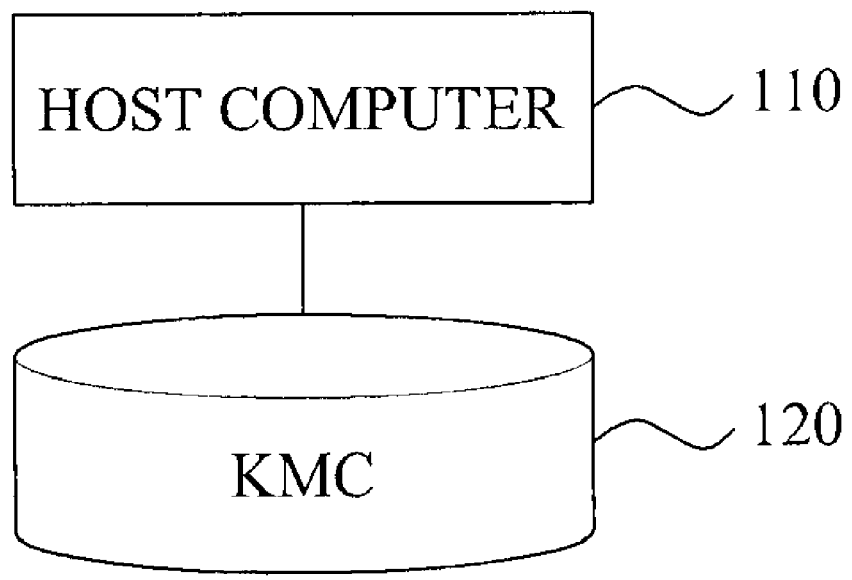
FIG. 3C is a block diagram illustrating a configuration of the host of FIG. 3A.

FIG. 3C is a block diagram illustrating a configuration of the host 100 of FIG. 3A. As shown in FIG. 3C, the host 100 may include a host computer 110 and a key management center (KMC) 120. The KMC 120 may be a database to store important information associated with a key. Although the KMC 120 is provided outside the host computer 110 in FIG. 3C, a storage device included in the host computer 110 may perform the same function without need to externally provide the KMC 120. Information stored in the KMC 120 will be described later.

Figure 4:
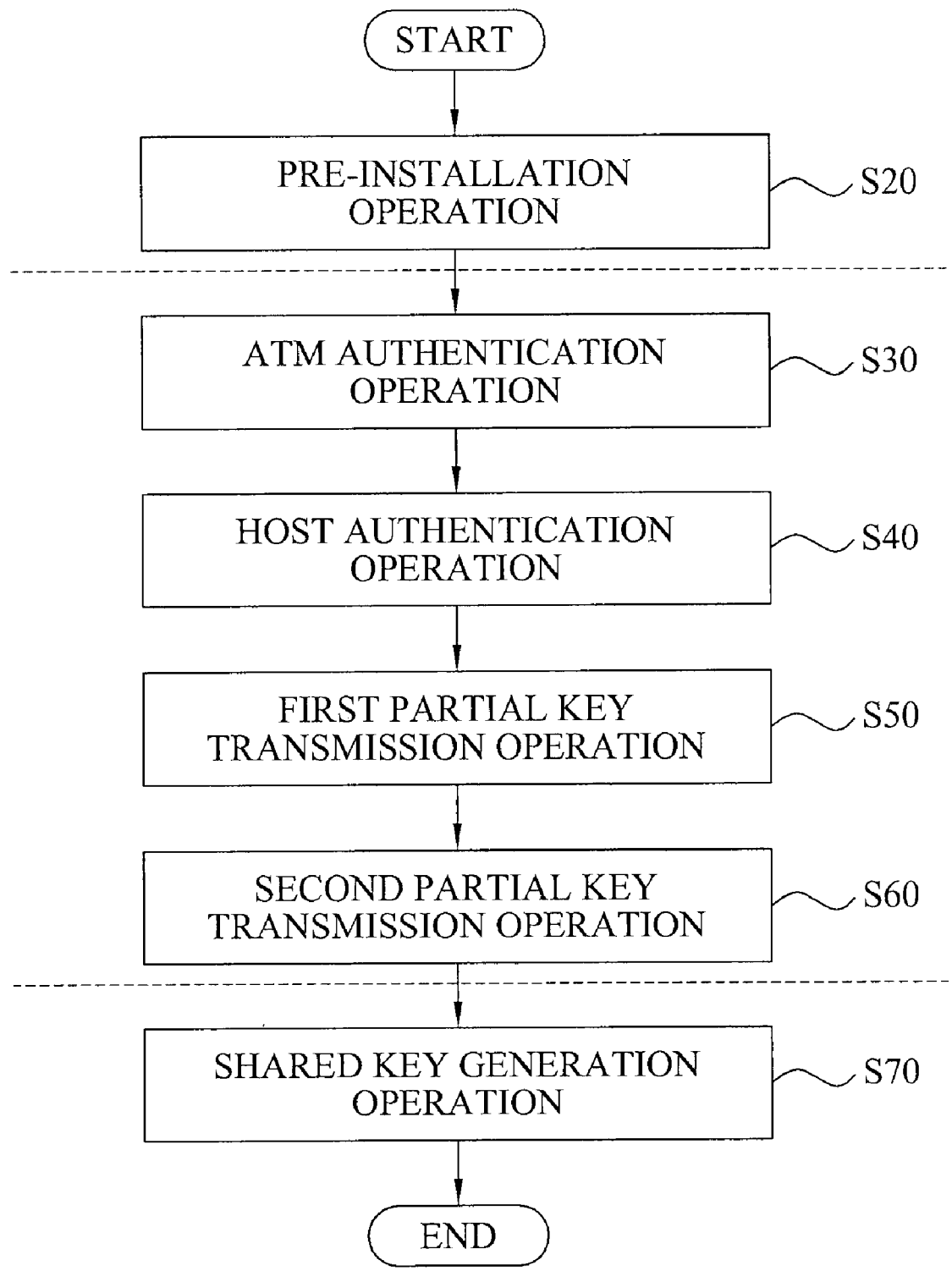
FIG. 4 illustrates a process of establishing a shared key to be used between a host and an ATM according to an embodiment of the present invention.

FIG. 4 illustrates a process of establishing a shared key to be used between a host and an ATM according to an embodiment of the present invention. In this instance, the host 100 and the ATM 200 of FIG. 3A may be applicable to the shared key establishing process of FIG. 4.

The shared key establishing process may include a pre-installation operation S20, an ATM authentication operation S30, a host authentication operation S40, a first partial key transmission operation S50, a second partial key transmission operation S60, and a shared key generation operation S70.

The pre-installation operation S20 may be an operation of installing and storing in advance information that is required for the host 100 and the ATM 200.

Figure 5A:
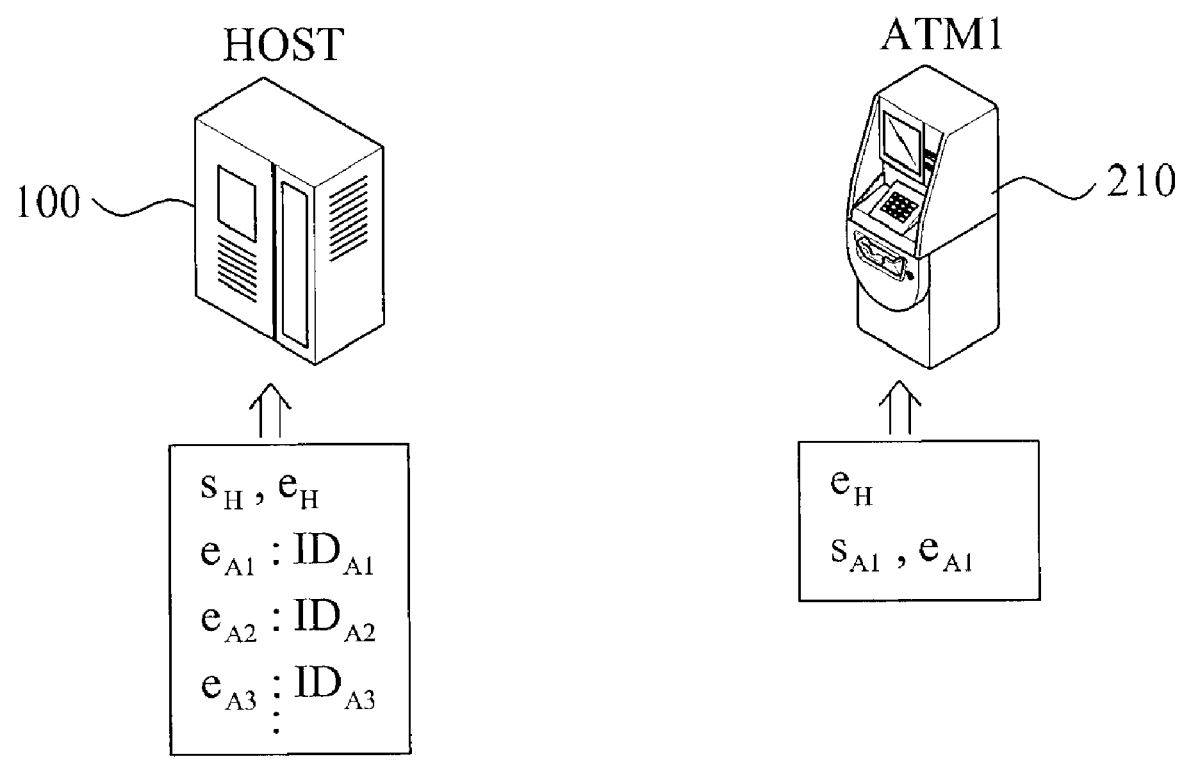
FIG. 5A illustrates an example of installing and storing in advance information required for a host and an ATM in a pre-installation operation of FIG. 4.

FIG. 5A illustrates an example of installing and storing in advance information required for a host 100 and an ATM (1) 210 in the pre-installation operation S20 of FIG. 4.

Referring to FIG. 5A, public keys ($e_{A1}$, $e_{A2}$, $e_{A3}$, . . . ) of ATMs and IDs ($ID_{A1}$, $ID_{A2}$, $ID_{A3}$, . . . ) corresponding thereto may be installed and be stored in the host 100. Also, a secret key $s_H$ and a public key $e_H$ of the host 100 may be installed and be stored in the host 100. The above values may be stored in the KMC 120 of FIG. 3C. When the host 100 transmits an encrypted message to the ATM (1) 210 corresponding to $ID_{A1}$ using the reliable public key $e_{A1}$ corresponding to $ID_{A1}$, other ATMs, excluding the ATM (1) 210 that is aware of a secret key $s_{A1}$, may not decrypt the encrypted message. Accordingly, ID information and public key information associated with each ATM may be pre-stored in the host 100.

Generally, a secret key and a public key of an ATM may be stored in the ATM. For example, the secret key $s_{A1}$ and the public key $e_{A1}$ of the ATM (1) 210 and the public key $e_H$ of the host 100 may be installed and be stored in ATM (1) 210 of which an ID is $ID_{A1}$. Since the above values are stored in the host 100 and the ATM (1) 210 in a safe environment, the host 100 and the ATM (1) 210 may trust the above values.

Figure 5B:
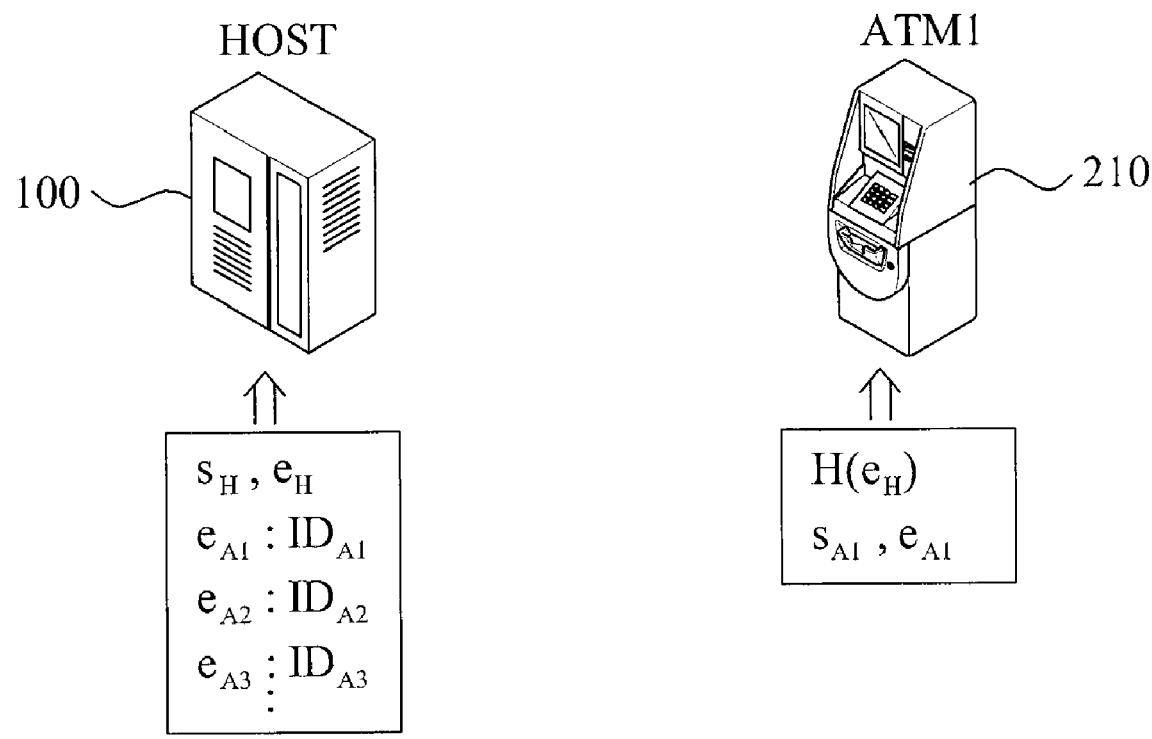
FIG. 5B illustrates another example of installing and storing in advance information required for the host and the ATM in the pre-installation operation of FIG. 4.

FIG. 5B illustrates another example of installing and storing in advance information required for the host 100 and the ATM1 210 in the pre-installation operation S20 of FIG. 4.

The public key $e_H$ of the host 100 is installed in the ATM (1(210 as is in FIG. 5A, whereas a hash value $H(e_H)$ of the public key $e_H$ of the host 100 is installed and is stored in the ATM (1) 210 in FIG. 5B. When the ATM (1) 210 desires to use the public key $e_H$ of the host 100, the ATM (1) 210 may receive the public key $e_H$ from the host 100 and obtain a hash value of the public key $e_H$ using a hash function. Next, when the hash value obtained using the hash function is the same as the hash value $H(e_H)$ stored in the ATM (1) 210, the ATM (1) 210 may authenticate and use the public key $e_H$ of the host 100.

The pre-installation operation S20 described with reference to FIGS. 5A and 5B may be performed in a safe environment and, desirably, be performed offline. According to an embodiment of the present invention, the pre-installation operation S20 may be performed to install and store public keys, IDs, and the like of a host and an ATM in a safe environment and thereby prepare a base to be used in an online process.

Referring again to FIG. 4, the ATM authentication process S30 may be an operation of authenticating, at the host 100, the ATM 200.

Figure 6A:
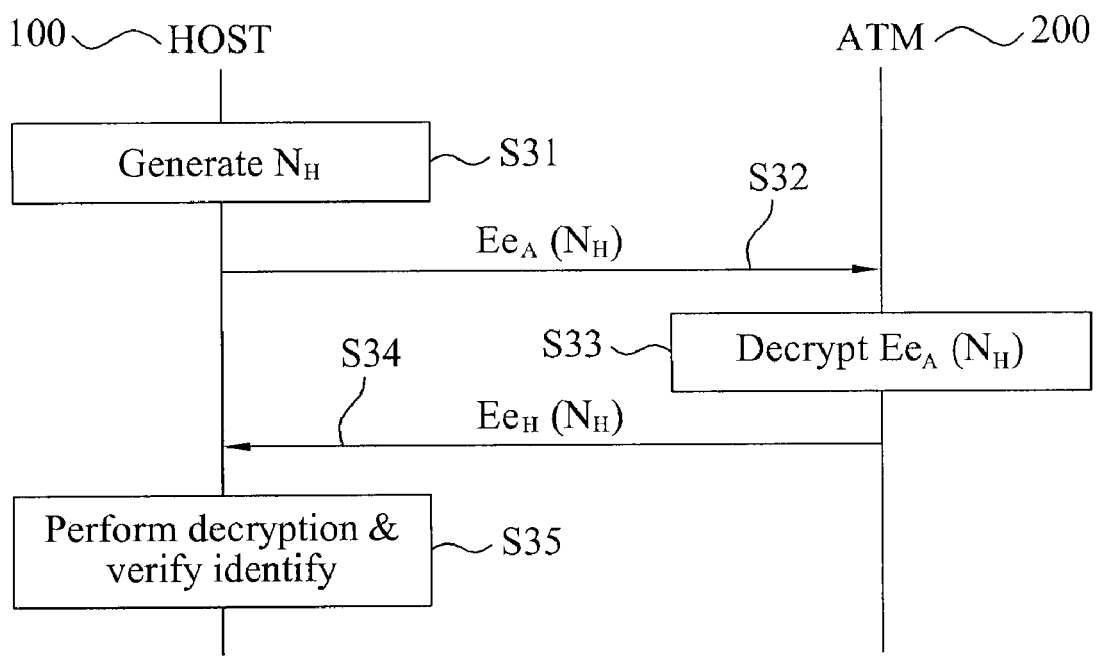
FIG. 6A illustrates an example of an ATM authentication operation of FIG. 4.

FIG. 6A illustrates an example of the ATM authentication operation S30 of FIG. 4. Operations S31 through S35 may be included in the ATM authentication operation S30 and thereby be performed.

In operation S31, the host 100 may generate $N_H$. Here, $N_H$ denotes a nounce generated at the host 100. The nounce indicates a number that is used once, or may be a random number generated in a random number generator, a time stamp, or a sequence number. In operation S32, the host 100 may encrypt the nounce $N_H$ using a public key $e_A$ of the ATM 200 to thereby generate a cryptogram $Ee_A(N_H)$ and may transmit the generated cryptogram $Ee_A(N_H)$ to the ATM 200. As described above, the public key $e_A$ of the ATM 200 of which an ID is $ID_A$ is installed and is stored in a KMC of the host 100 and thus may be used. Since the ID $ID_A$ and the public key $e_A$ of the ATM 200 are stored in a safe environment, the relationship therebetween may be reliable. Accordingly, only the ATM 200 with the ID $ID_A$ may decrypt the cryptogram $Ee_A$ ($N_H$) where the nounce $N_H$ is encrypted, using its secret key $s_A$.

In operation S33, the ATM 200 may decrypt the cryptogram $Ee_A(N_H)$ using the secret key $s_A$ of the ATM 200 to thereby obtain the nounce $N_H$.

In operation S34, the ATM 200 may encrypt the obtained nounce $N_H$ using the public key $e_H$ of the host 100 to thereby generate a cryptogram $Ee_H(N_H)$ and may transmit the generated cryptogram $Ee_H(N_H)$ to the host 100.

In operation S35, the host 100 may decrypt the received cryptogram $Ee_H(N_H)$ using the secret key $s_H$ of the host 100 to thereby obtain the nounce $N_H$, and may determine whether the nounce $N_H$ obtained in operation S35 is the same as the nounce $N_H$ generated and transmitted in operation S31. If the ATM 200 is a right ATM of which the ID is $ID_A$, the ATM 200 may obtain the nounce $N_H$ from the cryptogram $Ee_A(N_H)$ using its own secret key $s_A$ and thus may transmit the obtained nounce $N_H$ to the host 100. However, If not, the ATM 200 may not decrypt the cryptogram $Ee_A(N_H)$ and thus may not transmit the nounce $N_H$. Through the above process, the host 100 may authenticate the ATM 200.

Referring again to FIG. 4, the host authentication operation S40 may be an operation of authenticating, at the ATM 200, the host 100.

Figure 6B:
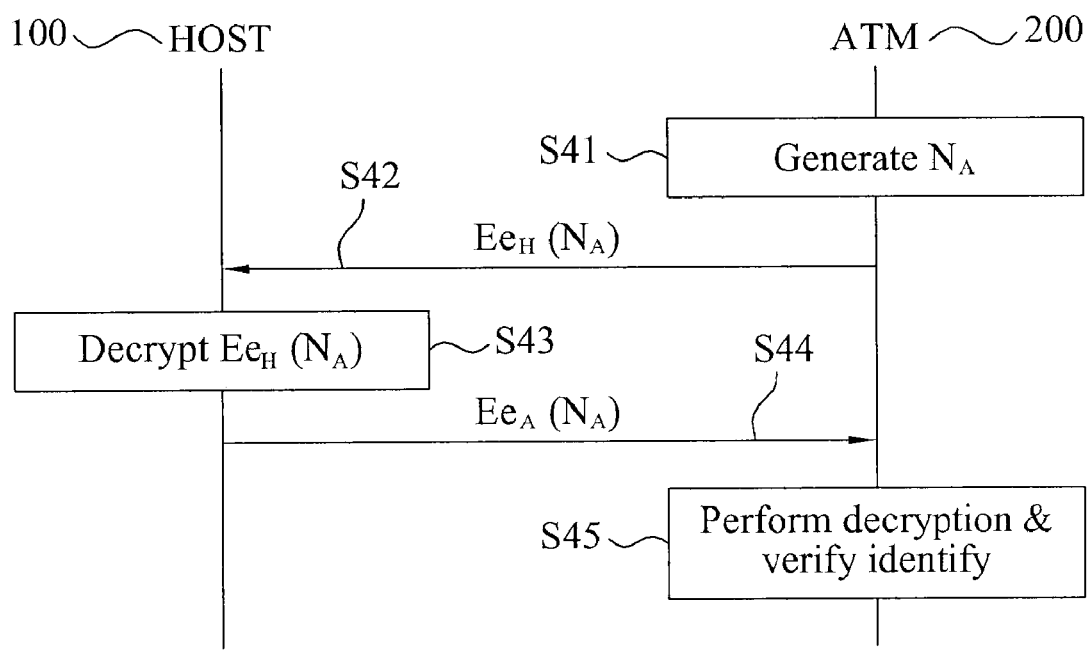
FIG. 6B illustrates an example of a host authentication operation of FIG. 4.

FIG. 6B illustrates an example of the host authentication operation S40 of FIG. 4. Operations S41 through S45 may be included in the host authentication operation S40 and thereby be performed.

In operation S41, the ATM 200 may generate $N_A$. Here, $N_A$ denotes a nounce generated at the ATM 200.

In operation S42, the ATM 200 may encrypt the nounce $N_A$ using a public key $e_H$ of the host 100 to thereby generate a cryptogram $Ee_H(N_A)$ and may transmit the generated cryptogram $Ee_H(N_A)$ to the host 100.

In operation S43, the host 100 may decrypt the cryptogram $Ee_H(N_A)$ using a secret key $s_H$ of the host 100 to thereby obtain the nounce $N_A$. In operation S44, the host 100 may encrypt the obtained nounce $N_A$ using the public key $e_A$ of the ATM 200 to thereby obtain a cryptogram $Ee_A(N_A)$ and may transmit the cryptogram $Ee_A(N_A)$ to the ATM 200.

In operation S45, the ATM 200 may decrypt the received cryptogram $Ee_A(N_A)$ using the secret key $s_A$ of the ATM 100 and may determine whether the nounce $N_A$ obtained in operation S45 is the same as the nounce $N_A$ generated and transmitted in operation S41. When they are the same as each other, the ATM 200 may determine the host 100 is reliable. Conversely, when they are different from each other, the ATM 200 may determine the host 100 is unreliable.

According to an embodiment of the present invention, a shared key to be shared between a host and an ATM may be generated based on a first partial key generated at the host and a second partial key generated at the ATM. Here, the term "partial key" may indicate the partial key does not perform a function as a single key and needs to be secured together with another key. The shared key to be shared between the host and the ATM may be, for example, a TMK. Hereinafter, the first partial key generated at the host may be referred to as $TMK_H$. The second partial key generated at the ATM may be referred to as $TMK_A$. When the host and the ATM obtain both $TMK_H$ and $TMK_A$, each corresponding shared key may be generated using a function such as $TMK=f(TMK_H, TMK_A)$. The function may be, for example, XOR.

Referring again to FIG. 4, the first partial key transmission operation S50 may be an operation of generating, at the host 100, a first partial key to transmit the generated first partial key to the ATM 200.

Figure 6C:
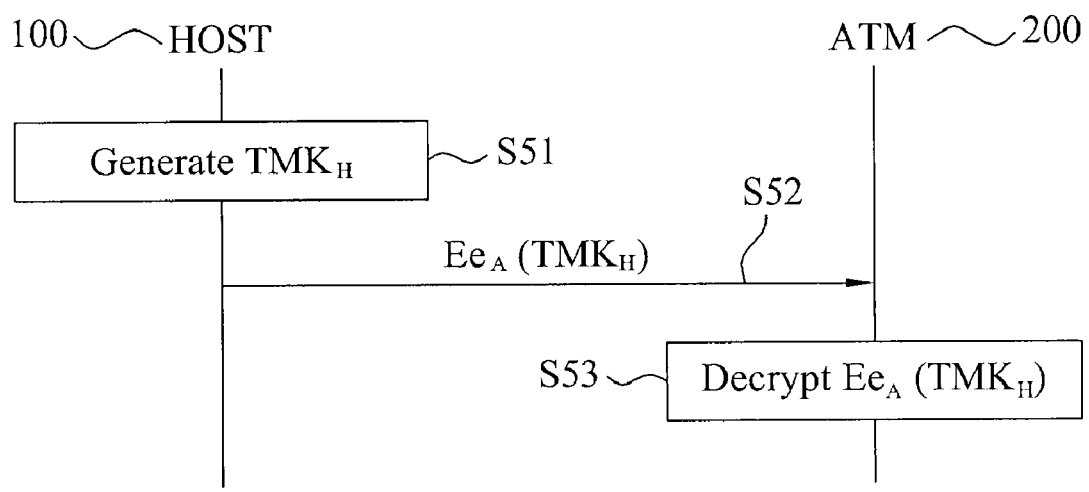
FIG. 6C illustrates an example of a first partial key transmission operation of FIG. 4.

FIG. 6C illustrates an example of the first partial key transmission operation S50 of FIG. 4. Operations S51 through S53 may be included in the first partial key transmission operation S50 and thereby be performed.

In operation S51, the host 100 may generate $TMK_H$ corresponding to a first partial key. In operation S52, the host 100 may encrypt $TMK_H$ using the public key $e_A$ of the ATM 200 to thereby generate a cryptogram $Ee_A(TMK_H)$ and may transmit the generated cryptogram $Ee_A(TMK_H)$ to the ATM 200.

In operation S53, the ATM 200 may decrypt the received cryptogram $Ee_A(TMK_H)$ using its own secret key $s_A$ to thereby obtain the first partial key $TMK_H$.

Referring again to FIG. 4, the second partial key transmission operation S60 may be an operation of generating, at the ATM 200, a second partial key to transmit the generated second partial key to the host 100.

Figure 6D:
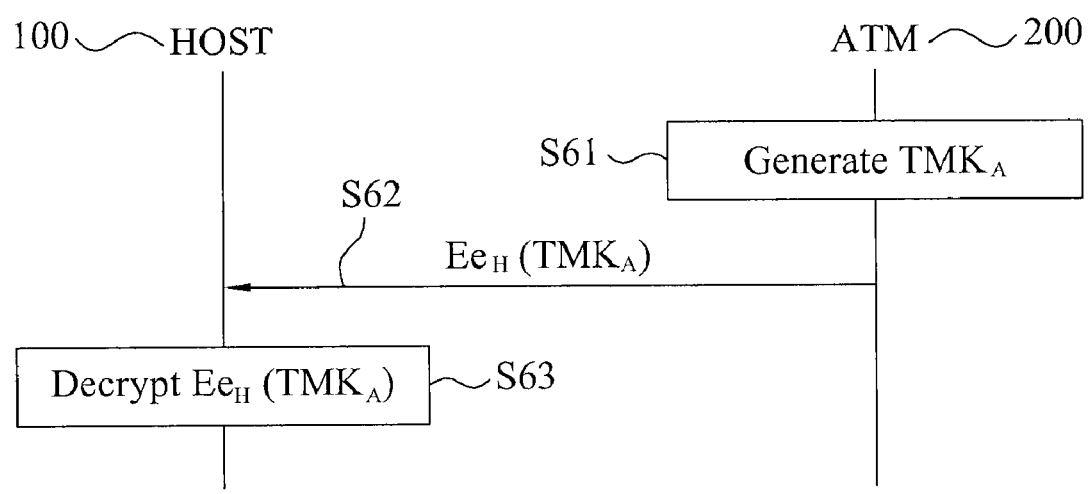
FIG. 6D illustrates an example of a second partial key transmission operation of FIG. 4.

FIG. 6D illustrates an example of the second partial key transmission operation S60 of FIG. 4. Operations S61 through S63 may be included in the first partial key transmission operation S60 and thereby be performed.

In operation S61, the ATM 200 may generate $TMK_A$ corresponding to a second partial key. In operation S62, the ATM 200 may encrypt $TMK_A$ using the public key $e_H$ of the host 100 to thereby generate a cryptogram $Ee_H(TMK_A)$ and may transmit the generated cryptogram $Ee_H(TMK_A)$ to the host 100.

In operation S63, the host 100 may decrypt the received cryptogram $Ee_H(TMK_A)$ using its own secret key $s_H$ to thereby obtain the second partial key $TMK_A$.

Although the ATM authentication operation S30, the host authentication operation S40, the first partial key transmission operation S50, and the second partial key transmission operation S60 of FIG. 4 are illustrated in time series through FIGS. 6A through 6D, the present invention is not limited thereto. Specifically, all or a portion of the above operations S30 through S60 may be overlapped with each other and thereby be simultaneously performed.

For example, operation S34 included in the ATM authentication operation S30 of FIG. 6A and operation S42 included in the host authentication operation S40 of FIG. 6B may be integrated and thereby be simultaneously performed. Also, although only $N_H$ is encrypted and is transmitted in operation S34 and only $N_A$ is encrypted and is transmitted in operation S42, it is also possible to simultaneously encrypt and transmit both $N_H$ and $N_A$. Also, it is possible to simultaneously transmit a nounce and another nounce, and to simultaneously transmit the nounce and a partial key. It is not always that the partial key may need to be transmitted to a counter party only after an authentication of the counter party is completed. Specifically, when the counter party is not authenticated after transmitting the partial key, it will be good to not use the partial key.

Also, although the shared key establishing process is performed in an order of the ATM authentication operation S30, the host authentication operation S40, the first partial key transmission operation S50, and the second partial key transmission operation S60 in FIG. 4, the present invention is not limited thereto. Specifically, the above operations S30 through S60 may be performed in any order. For example, an order of the ATM authentication operation S30 and an order of the host authentication operation S40 may be changed. Also, an order of the first partial key transmission operation S50 and an order of the second partial key transmission operation S60 may be changed. The ATM authentication operation S30, the host authentication operation S40, and the second partial key transmission operation S60 may be performed after performing the first partial key transmission operation S50.

Referring again to FIG. 4, the shared key generation operation S70 may be an operation of generating, at the host 100 and the ATM 200, a shared key.

The shared key generation operation S70 may be an operation of generating the shared key based on a first partial key and a second partial key. For example, when the first partial key generated at the host 100 is $TMK_H$, and the second partial key generated at the ATM 200 is $TMK_A$, the shared key TMK may be generated using a function such as $TMK=f(TMK_H, TMK_A)$.

The shared key to be used at the host 100 may be the same as the shared key to be used at the ATM 200. The shared key to be used at the host 100 may be generated when the second partial key $TMK_A$ reaches the host 100. Also, the shared key to be used at the ATM 200 may be generated when the first partial key $TMK_H$ reaches the ATM 200. In this instance, it may be a different operation of determining whether the first partial key $TMK_H$ and the second partial key $TMK_A$ are transmitted from right parties.

Accordingly, the shared key generation operation S720 may be performed at different points in time with respect to the host 100 and the ATM 200, respectively. As described above, the shared key to be used at the host 100 may be generated when the second partial key $TMK_A$ reaches the host 100. Also, the shared key to be used at the ATM 200 may be generated when the first partial key $TMK_H$ reaches the ATM 200. Accordingly, although all of the host authentication operation S40, the first partial key transmission operation S50, and the second partial key transmission operation S60 are not completed, the shared key generation operation S70 may be performed.

Figure 7:
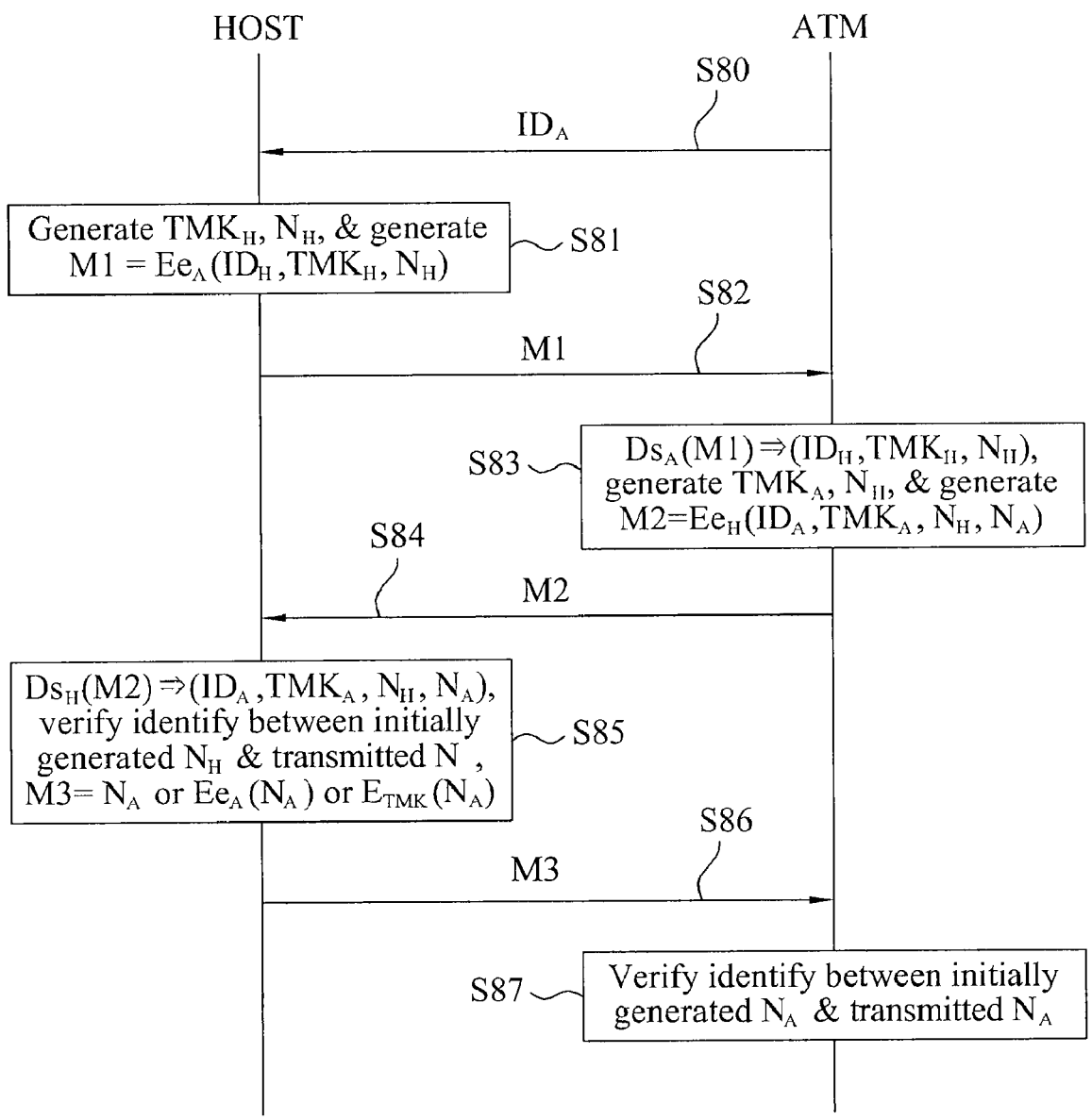
FIG. 7 illustrates a process of establishing a shared key to be used between a host and an ATM according to another embodiment of the present invention.

FIG. 7 illustrates a process of establishing a shared key to be used between a host and an ATM according to another embodiment of the present invention. Referring to FIG. 7, the host authentication operation S40, the first partial key transmission operation S50, and the second partial key transmission operation S60 of FIG. 4 are partially overlapped with each other.

In operation S80, the ATM may transmit, to the host, information containing $ID_A$ corresponding to its own numbered.

In operation S81, the host may generate $TMK_H$ and $N_H$. Here, $N_H$ denotes a nounce generated at the host. The nounce indicates a number that is used once, or may be a random number generated in a random number generator, a time stamp, or a sequence number. Also, in operation S81, the host may encrypt information, containing $ID_H$, $TMK_H$, and the nounce $N_H$, using a public key $e_A$ of the ATM to thereby generate a cryptogram M1. The public key $e_A$ of the ATM of which the ID is $ID_A$ is installed and is stored in a KMC of the host, and thus may be used. Since the ID $ID_A$ and the public key $e_A$ of the ATM are stored in a safe environment, the relationship therebetween may be reliable. Accordingly, only the ATM with the ID $ID_A$ may decrypt the cryptogram M1 where $ID_H$, $TMK_H$, and $N_H$ are encrypted, using its own secret key $s_A$.

In operation S82, the host may transmit the cryptogram M1 to the ATM and the ATM may receive the cryptogram M1.

In operation S83, the ATM may decrypt the cryptogram M1 using the secret key $s_A$ of the ATM to thereby obtain $ID_H$, $TMK_H$, and $N_H$. The ATM may generate $TMK_A$ and $N_A$. Here, $TMK_A$ denotes a second partial key generated at the ATM, and $N_A$ denotes a nounce generated at the ATM. Also, the ATM may encrypt $ID_A$, $TMK_A$, $N_A$, and $N_H$ using a public key $e_H$ of the host to thereby generate a cryptogram M2.

A characteristic matter in operation S83 is that the nounce $N_H$ is included in the cryptogram M2. The nounce $N_H$ may be generated at the host and be included in the cryptogram M1 to thereby be transmitted to the ATM. To return, to the host, the nounce $N_H$ generated at the host is in order to verify a decryption capability of the host. Specifically, in the case of a right ATM of which the ID is $ID_A$, the ATM may obtain the nounce $N_H$ using its own secret key $s_A$ and thus may return the received nounce $N_H$. However, a wrong ATM may not decrypt the cryptogram M1 and thus may not provide the right nounce $N_H$.

In operation S84, the ATM may transmit the cryptogram M2 to the host and the host may receive the cryptogram M2.

In operation S85, the host may decrypt the cryptogram M2 using its secret key $s_H$ to there by obtain $ID_A$, $TMK_A$, $N_H$, and $N_A$, and may determine whether the nounce $N_H$ generated at the host and transmitted to the ATM in operation S81 is the same as the nounce $N_H$ included in the cryptogram M2 received from the ATM. Although a nounce transmitted from the host may be different from a nounce received at the host, the same symbol $N_H$ is used here for ease of description. For example, a wrong ATM may not decrypt the cryptogram M1 and thus may not provide a right nounce $N_H$ to the cryptogram M2.

Specifically, when the nounce $N_H$ generated at the host and transmitted to the ATM in operation S81 is different from the nounce $N_H$ included in the cryptogram M2 received from the ATM, a corresponding ATM may not be a right ATM and thus the shared key establishing process may need to be suspended. Conversely, when the nounce $N_H$ generated at the host and transmitted to the ATM in operation S81 is the same as the nounce $N_H$ included in the cryptogram M2 received from the ATM, the ATM that has transmitted the cryptogram M2 may be considered as an ATM that has the secret key $s_A$ corresponding to the public key $e_A$. Since the host already stores reliable information with respect to the relationship between $ID_A$ and $e_A$, the ATM that has transmitted the cryptogram M2 may be verified as the ATM of which the ID is $ID_A$. In this instance, a case where the secret key $s_A$ of the ATM is leaked and is used by an attacker may be excluded from the discussion.

Next, the host may prepare a message M3 to be transmitted to the ATM. In this instance, the nounce $N_A$ may be encrypted or not be encrypted in the message M3. An operation of transmitting the nounce $N_A$ to the ATM may be required so that the ATM may verify a decryption capability of the host and authenticate the host. Encryption may be performed using the public key $e_A$ of the ATM or may be performed by using the shared key TMK. As described above, the TMK may be obtained by inputting the first partial key $TMK_H$ generated at the host, and the second partial key $TMK_A$ generated at the ATM, and by performing a predetermined function operation. In this instance, $TMK_H$ and $TMK_A$ are already secured by the host and the ATM. When the nounce $N_A$ is transmitted using the shared key TMK, instead of using the public key $e_A$ of the ATM, the ATM may verify the nounce $N_A$ only by the shared key TMK. Only when the shared key TMK to be used at the host is the same as the shared key TMK to be used at the ATM, the ATM may verify an identify of the nounce $N_A$. Through the process of verifying, at the ATM, the identity of the nounce $N_A$, the identify of the shared key TMK may be verified.

In operation S86, the host may transmit the message M3 to the ATM. When it is required to decrypt the received message M3, the ATM may decrypt the received message M3. Otherwise, the ATM may directly obtain the nounce $N_A$.

In operation S87, the ATM may determine whether the nounce $N_A$ included in the cryptogram M2 transmitted in operation S84 is the same as the nounce $N_A$ included in the message M3 received from the host. When the nounce $N_A$ included in the cryptogram M2 transmitted in operation S84 is the same as the nounce $N_A$ included in the message M3 received from the host, the ATM may determine the host is reliable. Otherwise, the ATM may determine the host is unreliable.

Although not shown in FIG. 7, the host and the ATM may secure $TMK_H$ and $TMK_A$, respectively, to thereby generate a TMK. A point of generation may not be an issue. Specifically, after the ATM decrypts the cryptogram M1 and generates the second partial key $TMK_A$, the ATM may generate the TMK at any time. Also, after the host generates the first partial key $TMK_H$ and decrypts the cryptogram M2, the host may generate the TMK at any time.

According to an embodiment of the present invention, when transmitting a partial key and a nounce to a counter party, it is not always that the partial key and the nounce may need to be included in the same cryptogram and thereby be transmitted. Specifically, the partial key and the nounce may be included in separate cryptograms and thereby be transmitted. Although the host initially transmits its nounce $N_H$ to the ATM in FIG. 7, the present invention is not limited thereto. Specifically, the ATM may initially transmit its nounce $N_A$ to the host. Also, although the host initially transmits its partial key $TMK_H$ to the ATM in FIG. 7, the ATM may initially transmit its partial key $TMK_A$ to the host.

Although a relationship between a single ATM and a single host is shown in FIG. 7, it is only an example and thus the present invention is not limited thereto. Specifically, depending on embodiments, a plurality of ATMs and a plurality of hosts may exist. Also, in FIG. 7, $ID_H$ and $ID_A$ are included in the cryptogram M1 and the cryptogram M2, respectively, and thereby are transmitted, but the present invention is not limited thereto.

As described above, according to embodiments of the present invention, a certificate authority may not be required. Accordingly, it is possible to reduce costs and procedures that may be required to use or operate the certificate authority.

Also, according to embodiments of the present invention, there may be no need to generate and verify a certificate. Accordingly, it is possible to reduce overheads that may occur in generating and verifying the certificate.

Also, according to embodiments of the present invention, a host and an ATM may generate partial keys, respectively, and operate the generated partial keys to thereby generate a shared key. Specifically, since it is difficult for two partial keys to be leaked at a time, it is possible to more securely prevent a leakage of the shared key.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A host to perform a data communication with an automatic teller machine and to establish online a shared key to be used for the data communication, the host comprising:
  a key management center to store a public key of the automatic teller machine and an ID thereof, and
  a host computer i) to generate first information including a first partial key and a first nounce to transmit, to the automatic teller machine, a first cryptogram where the first information is encrypted using the public key of the automatic teller machine, ii) to receive, from the automatic teller machine, a second cryptogam where second information is encrypted using a public key of the host, wherein the second information includes the first nounce that is obtained by decrypting, at the automatic teller machine, the first cryptogram, and a second partial key and a second nounce that are generated at the automatic teller machine, iii) to determine whether the first nounce obtained by decrypting the second cryptogram is the same as the first nounce included in the first information, and iv) to transmit, to the automatic teller machine, third information including the second nounce that is obtained by decrypting the second cryptogram,
  wherein the shared key is generated based on the first partial key and the second partial key.

2. The host of claim 1, wherein the third information is encrypted using the shared key and thereby is transmitted.

3. The host of claim 1, wherein:
  the first information further includes an ID of the host, and
  the second information further includes the ID of the automatic teller machine.

4. The host of claim 1, wherein each of the first nounce and the second nounce is a random number, a time stamp, or a sequence number.

5. An automatic teller machine to perform a data communication with a host and to establish online a shared key to be used for the data communication, the automatic teller machine comprising:
  a storage unit to store a public key of the host and a secret key of the automatic teller machine; and
  a control unit i) to control the automatic teller machine to receive, from, the host, a first cryptogram where first information including a first partial key and a first nounce is encrypted using a public key of the automatic teller machine, ii) to control the automatic teller machine to generate a second partial key and a second nounce, to decrypt the first cryptogram using a secret key corresponding to the public key of the automatic teller machine to thereby obtain the first partial key and the first nounce, and to generate a second cryptogram where second information including the second partial key, the first nounce, and the second nounce are encrypted using the public key of the host, to thereby transmit the second cryptogram to the host, iii) to control the automatic teller machine to receive, from the host, third information including the second nounce that is obtained by decrypting, at the host, the second cryptogram, and iv) to control the automatic teller machine to determine whether the second nounce included in the third information is the same as the second nounce included in the second cryptogram,
  wherein the shared key is generated based on the first partial key and the second partial key.

6. The automatic teller machine of claim 5, wherein the third information is encrypted using the shared key and thereby is received.

7. The automatic teller machine of claim 5, wherein:
  the first information further includes an ID of the host, and
  the second information further includes the ID of the automatic teller machine.

8. The automatic teller machine of claim 5, wherein each of the first nounce and the second nounce is a random number, a time stamp, or a sequence number.

9. The automatic teller machine of claim 5, wherein a storage unit further stores a hashing value of the public key of the host.

10. A method of establishing a shared key to be used between a host and an automatic teller machine, the method comprising:
  a first operation of generating, at the host, a first partial key and encrypting first information including the first partial key to transmit the encrypted first information to the automatic teller machine; and
  a second operation of generating, at the automatic teller machine, a second partial key and encrypting second information including the second partial key to transmit the encrypted second information to the host,
  wherein the shared key to be used between the host and the automatic teller machine is generated by operating the first partial key and the second partial key.

* * * * *